United States Patent Office 3,045,707
Patented July 24, 1962

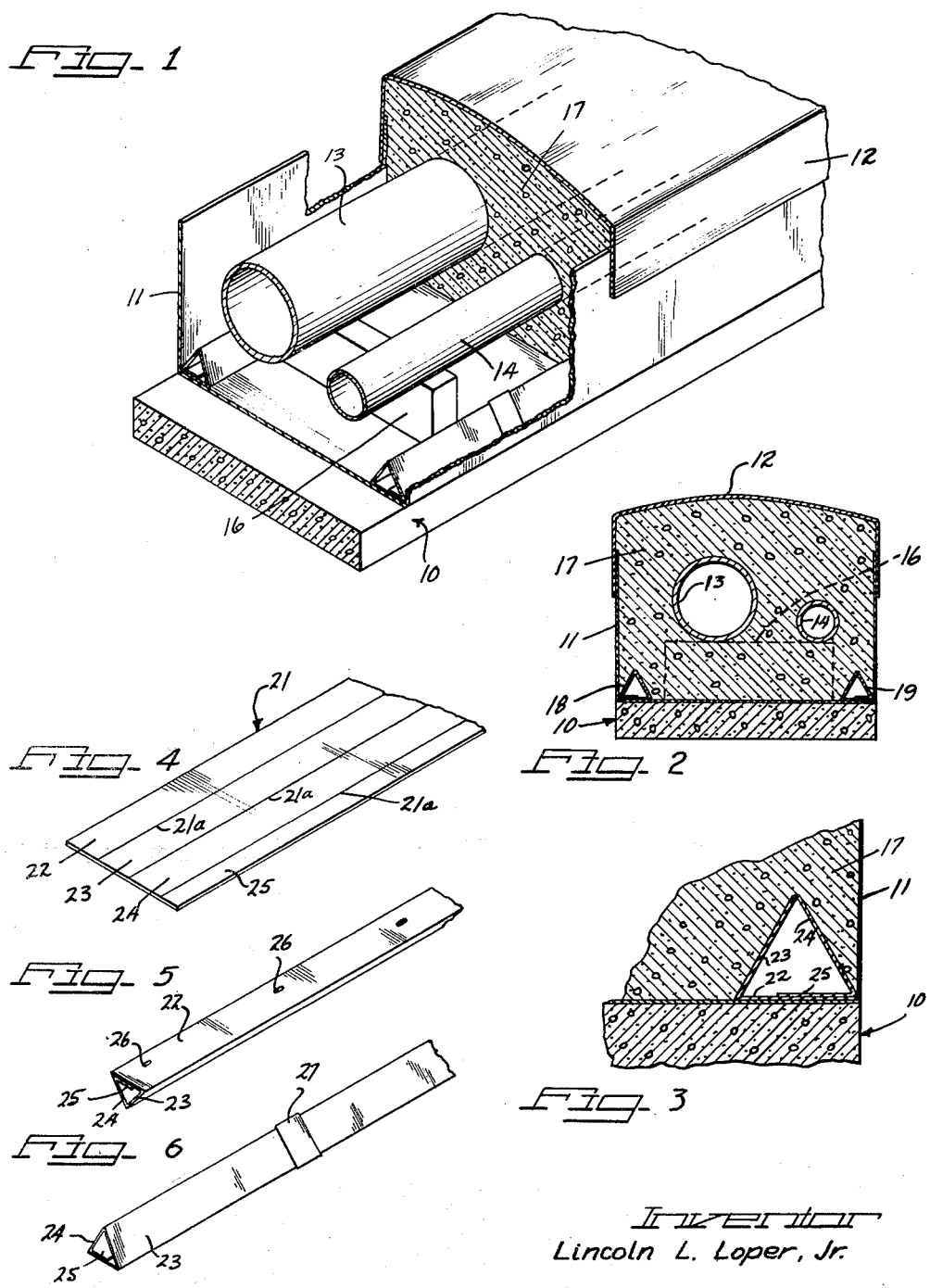

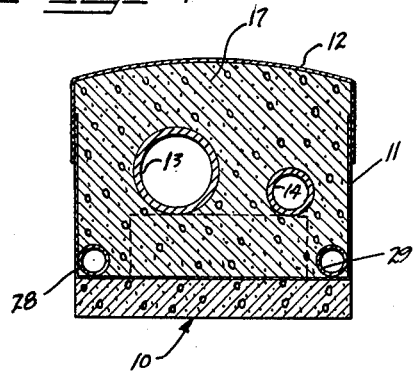
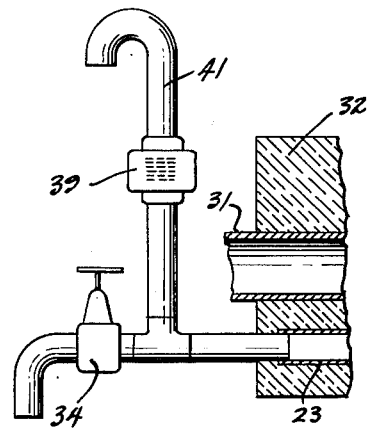
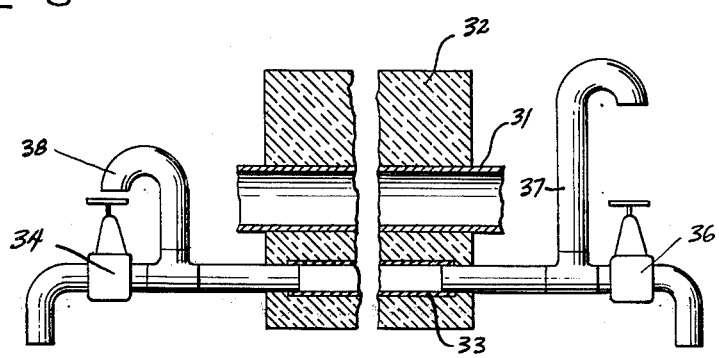
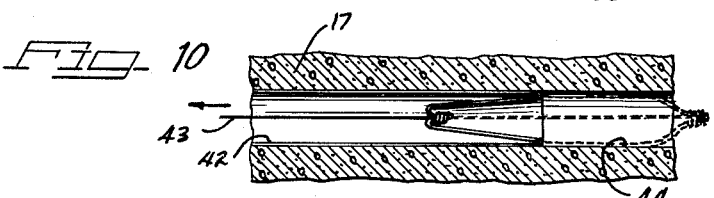
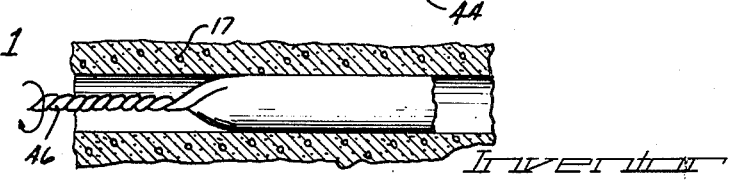
Lincoln L. Loper, Jr.

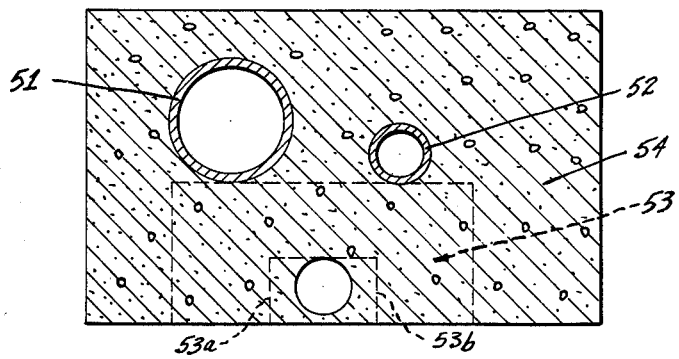
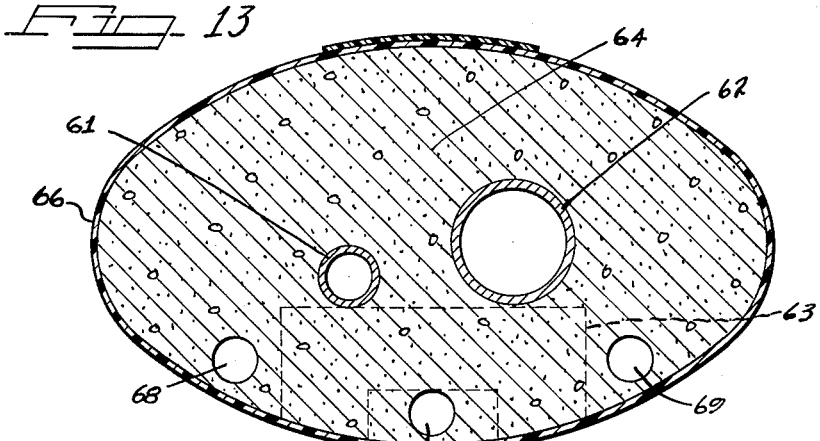
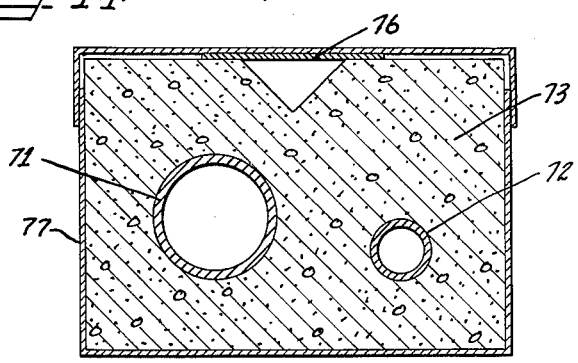
Inventor
Lincoln L. Loper, Jr.

3,045,707
VENTED INSULATED PIPE STRUCTURES
Lincoln L. Loper, Jr., Bellevue, Wash., assignor to Concrete Thermal Casings, Inc., Seattle, Wash., a corporation of Washington
Filed Feb. 16, 1960, Ser. No. 9,036
4 Claims. (Cl. 138—106)

The present invention is directed to improved insulated pipe systems for transporting heated or chilled fluids. While the present invention has particular applicability to underground insulated pipe systems, it is equally applicable to pipe systems which are suspended in air, these systems being frequently referred to by the trade as "overhead" systems.

The insulation of underground pipe systems has long been a subject for extensive study by engineers. It has long been appreciated that insulation disposed about a heated pipe must be protected from water in either the liquid form or in the vapor form. The problems incident to moisture penetration of insulation are present in underground systems for transporting steam and also in underground chilled water distribution systems which have become increasingly more important during recent years because of the increase in air conditioning systems and the increased use of chilled water in chemical processing plants.

One of the oldest systems intended to prevent moisture penetration in underground types of installations involved the use of metallic casings about the insulation which surrounded the pipe. These casings could be prefabricated in sections and welded into a continuous unit. They could be tested by an air pressure test similar to that used to locate leaks in piping systems. However, field experience is showing that these metallic casing systems are progressively troublesome as far as moisture problems are concerned because corrosion of the casing in the soil results in pin hole openings in the casing that allow liquid water to enter the insulation.

Attempts have also been made to provide liquid tight insulation systems with non-metallic casings. The most common of these is the familiar encasement of the pipe insulation with felts impregnated with pitch or other bituminous material and then mopped in place with melted bituminous material. While this type of system may be satisfactory initially, experience has shown that the resistance to water and water vapor penetration possessed by this type of installation is not nearly as permanent as desired.

In the past, the emphasis in providing a waterproofed insulation has been to make a completely closed system. For this purpose, the ends of the underground pipe system were frequently closed off with gland seals to provide as water tight a connection as possible to the ends of the system to avoid any possible back up of water into the insulation from accidentally flooded man holes. However, the basic difficulty with this thinking is that it ignores the fact that the pipe does not always carry a heated fluid. During intervals of shut-down, there is a very substantial temperature drop occuring in the pipes. In a closed system, this results in a reduction in air pressure within the pipe with the result that a partial vacuum is created in the pipe. Since there is unavoidably some leakage present in any substantial area of waterproofing casing, either metallic or non-metallic, this partial vacuum tends to suck in water into the insulation. Then, when the heat is reapplied by introduction of steam or other heated fluid within the pipe, the vapor tends to leave the system through the pinholes which are unavoidably present in the insulation, but only at a very slow rate. The net result is the accumulation of water within the insulation and all the harmful effects which accompany water penetration.

Moisture vapor and liquid water may be present in insulation systems from various causes. Underground pipe installations may be damaged by improper backfill materials or procedures, or by subsequent operations in the vicinity which cause a break in the felt or in the concrete casing surrounding the felt, thereby creating a possible path for the entry of water into the conduit structure. In addition, if rupture of the pipe should occur due to improper welding or faulty pipe, the fluid from the pipe is likely to seep into the concrete casing.

In addition, it is frequently necessary to seal up the underground installation as soon as the insulating cement has set and before there has been any opportunity for the insulating concrete to dry by evaporation.

When a lightweight, thermally insulating concrete such as a vermiculite concrete is employed, there may be a large excess of water present inasmuch as the concrete may have as much as 90 to 150 pounds of water for every bag of Portland cement in order to provide the required flow properties for pouring. Since a bag of Portland cement requires only about 18 pounds of water for complete hydration, it is evident that a large amount of excess water is available for impairing the insulating value of the insulating assembly.

My invention is specifically directed to a poured-in-place concrete insulating system for the thermal insulation of pipes carrying fluids. With the systems of the present invention, the pipes can be provided with monolithic embedments running into hundreds of lineal feet without the risk of progressive accumulation of deterioration factors which always accompany the presence of water in insulation. This freedom from cumulative deterioration is an important objective of the present invention.

A general object of the present invention is to provide an improved embedment for pipe systems.

Another object of the invention is to provide a vented monolithic concrete insulation capable of continuously removing liquid water and water vapor from the insulation surrounding the pipe.

A further object of the invention is to provide an improved method for laying an underground pipe installation.

Another object of the invention is to provide an improved method for operating an underground pipe installation to eliminate progressive deterioration of the insulation by capillary moisture retention.

A further description of the present invention will be made in connection with the attached sheets of drawings which illustrate several embodiments thereof.

In the drawings:

FIGURE 1 is a view in perspective, partially broken away, to illustrate a form of the present invention;

FIGURE 2 is a cross-sectional view of the embodiment shown in FIGURE 1;

FIGURE 3 is an enlarged cross-sectional view of the assembly illustrated in FIGURE 2;

FIGURE 4 is a view in perspective of a blank suitable for the manufacture of the duct;

FIGURE 5 is a view of the blank of FIGURE 4 after it has been folded and stapled together;

FIGURE 6 illustrates the manner of joining two of the duct sections together;

FIGURE 7 is a cross-sectional view illustrating a modified form of duct;

FIGURE 8 is a view in elevation, and partly in cross-section, illustrating a thermal siphon system for the duct;

FIGURE 9 is a fragmentary view of one end of the insulated pipe assembly illustrating a modified form in which a blower is employed with the duct;

FIGURE 10 is a fragmentary view of a duct illustrating one manner for formation of such duct;

FIGURE 11 is a view similar to FIGURE 10 illustrating a manner for removing a duct former from the duct;

FIGURE 12 is a cross-sectional view of another embodiment of the invention;

FIGURE 13 is a cross-sectional view of a further modified form of the invention; and FIGURE 14 is a cross-sectional view of another modified form.

As shown in the drawings:

In FIGURE 1, reference numeral 10 indicates generally a poured structural concrete pad which rests upon the bottom of a trench dug for the purpose of accommodating a pipe line. A water impervious membrane 11 of generally U-shaped configuration is disposed over the pad 10, and a water impervious cover 12 overlaps the free ends of the membrane 11 as best illustrated in FIGURE 2 of the drawings.

The fluid carrying pipes, one or more in number, are represented by a relatively large diameter pipe 13 and a smaller diameter pipe 14 in the drawings. In this particular installation, the pipes 13 and 14 are shown temporarily supported on spaced support blocks 16 composed of a thermally insulating concrete mixture. The blocks 16 are not as wide as the pad 10 as illustrated in FIGURES 1 and 2. While the particular embodiment of the invention illustrated in the drawings comprehends the use of such support blocks, it should be understood that the invention is equally applicable to installations in which the fluid carrying pipes are guided and supported by the insulating concrete and to systems in which the pipes are guided and supported by means such as pipe guides, rollers, rockers and the like in which the insulation has primarily a thermal function.

The insulating concrete, generally indicated at numeral 17 in the drawings completely surrounds the pipes 13 and 14, and the support blocks 16. The blocks 16 and the insulating concrete 17 become a monolithic mass as soon as the concrete sets. I prefer to employ a lightweight thermally insulating concrete composition made with Portland cement and a lightweight aggregate, and suitable integral waterproofing agents such as calcium stearate, powdered air floated pitch, or commercially available asphalt emulsions. Such a composition can be made for example by combining one bag of Portland cement weighing 94 pounds with 8 cubic feet of expanded vermiculite having a particle size of minus ten to plus sixty-five mesh, 7 quarts of an asphalt emulsion prepared by mixing approximately 55 parts by weight of 50–60 penetration asphalt from California crude petroleum with about 43.35 parts of hot water containing substantially 0.15 part of caustic soda, and 26 gallons of water. The asphalt emulsion may be treated to convert the emulsion to the slow breaking mixing type by incorporating therein about 1.5 parts of a saponified "Vinsol" resin derived from the extraction of rosin with petroleum solvents.

Alternatively, the thermal insulation may be a heated, compressed mass of a light weight aggregate coated with a deformable thermoplastic binder. This type of composition is described in Goff Patent No. 2,901,775. Typically, the composition may be expanded vermiculite coated with asphalt and compressed about the pipe until the original volume of the particles is reduced by a value of from 10% to 25% of the original.

In accordance with the present invention, I provide one or more vents for carrying away liquid water and moisture vapor which may, through one process or another, become absorbed in the capillaries of the insulating embedment 17. In the form of the invention illustrated in FIGURES 1 to 6, these vents take the form of triangular ducts 18 and 19 extending in parallel spaced relationship to the pipes 13 and 14, and located at the lowermost corners of the embedment 17.

The ducts 18 and 19 are made of a water-pervious material. Since the ducts must be form sustaining sufficiently to resist collapse by the pouring of the concrete 17, yet must be capable of being penetrated by any water present, it has been found convenient to make these ducts of heavy cardboard. They are also preferably made with the flat face, such as the triangular form shown, so that they can be readily secured to the water impervious membrane 11 to prevent misalignment during the pouring of the concrete 17.

The ducts 18 and 19 can be made at the job site from blanks of the types illustrated in FIGURE 4 of the drawings. As illustrated, the blank 21 has score lines 21a which facilitate folding the blank into the triangular form consisting of three substantially equal sides 22, 23 and 24, and a narrower side 25. The latter is tucked in as illustrated in FIGURE 5, and then stapled to the side 22 by means of staples 26. It is generally preferable to make the blanks 21 of relatively small size so that they can be handled easily. Successive lengths may be joined end to end, to any desired length by securing individual lengths together by means of a tape or sleeve 27 as illustrated in FIGURE 6.

The structure shown in FIGURE 7 is essentially the same as that shown in FIGURE 2, with the exception that the drain ducts take the form of cylindrical tubes 28 and 29 disposed in parallel spaced relationship to the pipes 13 and 14 at the lowermost corners of the embedment 17.

In the operation of underground systems employing vent structures, it has been found necessary in some cases to provide for forced movement of air within the ducts in order to remove moisture as quickly as possible. For this purpose, the systems shown in FIGURES 8 and 9, or a combination of both, may be employed. FIGURE 8 illustrates a system in which a fluid carrying pipe 31 is embedded in the thermally insulating concrete embedment 32 and provided with a duct 33. The ends of the duct 33 are connected to a pair of spigots 34 and 36 respectively. The spigots 34 and 36 are intended to be open only when water is to be drained from the duct 33.

The assembly also includes a thermal siphon provided by a pair of air vents consisting of a relatively long vent 37 and a shorter vent 38 on opposite ends of the duct 33. Both of these air vents 37 and 38 are open and are located above the normal flood level of the manhole in which the vents are disposed, thereby eliminating the possibility of return of water back into the duct 33.

Actually, the difference in level between the two vents is not absolutely necessary. The temperature difference between vents of equal height will provide the pressure difference needed for circulation. Differences in height aid in getting the circulation started in the desired direction.

Instead of, or in addition to the system shown in FIGURE 8, the draining end of the installation may include a blower 39 disposed in an air vent 41, as best illustrated in FIGURE 9 of the drawings. The function of the blower 39, of course, is to provide the forced circulation of air through the duct 33 as required to keep the duct in a substantially dry condition.

With both of the modifications illustrated at FIGURES 8 and 9, it will be evident that the interior of the insulation is kept at the ambient atmospheric pressure at all times. As a result, there is less tendency for any water present to be sucked into the body of the insulation by the reduced pressure conditions.

While the embodiments of the invention previously described made use of a rigid walled vent, I prefer to employ a vent which does not having rigid containing walls but is formed directly into the body of the insulating concrete embedment. FIGURES 10 and 11 illustrate portions of the process involved in this type of installation. Basically, the duct forming member consists of a normally flat tube of a plastic material such as polyethylene resin. In the form of the invention illustrated in FIGURE 10, the polyethylene tube 42 has a reasonably strong string 43 such as a nylon string contained therein. The tube 42 in its collapsed condition is laid over the slab 10, and on the impervious member 11, if one is used, with its end extending beyond the end of the slab. A short length of the string 43 is then drawn through the end of the tube 42, and the end is gathered together. The end of the string 43 is then tied to the outside end of the tube 42 as illustrated in the dashed line showing in FIGURE 10. Then, the tube 42 may be filled with air pressure or with a liquid, depending on the bulk density and rigidity of the insulating material being placed about the pipe, in order to keep the tube expanded. The insulation 17 is then poured around the tube 42 and permitted to set. If the coated aggregate particles of the aforementioned Goff Patent No. 2,901,775 are employed, it is only necessary to allow the mass to cool. Then, the tube 42 is removed by applying tension on the string 43 in the direction of the arrow indicated in FIGURE 10. The tube is readily removable from the channel 44 formed therein because the plastic tube has an extremely low coefficient of friction.

FIGURE 11 illustrates still another method for removing the tube from the set concrete in the manufacture of the duct. In this embodiment, a plastic tube 46 filled with air or other fluid is removed by twisting the tube along its longitudinal axis. Any air or fluid is thereby forced out and the tube is collapsed into a twisted ribbon which can be readily withdrawn from the duct.

The air circulation and drainage duct can also be formed by using commercially available rubber tubing which is kept expanded to a fixed diameter by internal air or hydraulic pressure during the time required to set the insulating material. After the insulating material sets, the internal pressure in the rubber tubing is released and the tubing contracts to a smaller diameter in which state it can be easily pulled out of the duct at whichever end is most convenient.

In FIGURE 12, I have illustrated a further modification which employs no pad and in which the vent is located centrally of the embedment. Specifically a pair of fluid carrying pipes 51 and 52 are temporarily supported on spaced chair-type supports 53, before such supports are received in the monolithic embedment of insulating material 54. In this embodiment, a vent 56 is located between the legs 53a and 53b of the support.

The structure of FIGURE 13 is still another variant. In this instance, a pair of pipes 61 and 62 are supported temporarily on chair type supports 63. The embedment 64 consists of a thermal insulation in a generally oval form and surrounded by a water impervious shell 66. The vents in this instance consist of a centrally disposed vent 67 and two parallel vents 68 and 69.

The vent means may also be located at the top of the embedment, as illustrated in FIGURE 14, particularly where there is an appreciable difference in level between the ends of the pipe runs. In this form a pair of pipes 71 and 72 are embedded in a monolithic thermally insulating embedment 73. A vent 74 having a V-shaped configuration is skived out or otherwise formed in the insulation while the insulation is plastic. A metal or other rigid plate 76 is placed over the vent 74 to form the top for the duct, and the whole assembly is covered with a waterproofing membrane 77.

In the modifications illustrated in the drawings, the drain ducts are disposed at the bottom of the concrete embedment, at the corners thereof, or at the top of the insulating mass. Additional advantages may be secured if the ducts are located at points intermediate the outer periphery of the fluid carrying pipe and the outer surface of the concrete embedment. These advantages and structures are more fully set forth in the copending application of George E. Ziegler, Serial No. 786,169, filed January 12, 1959.

In any commercial embodiment, forms for the ducts will be used at elbows and in loops. In straight runs of pipe, economical fabrication dictates one of the low cost removable form methods illustrated in FIGURES 10 and 11.

It should be noted that the method of manufacture illustrated in FIGURE 10 of the drawings lends itself readily to locating the vents at any desired position. Since the concrete embedment in which the tube is to be located is normally a lightweight material having a wet or liquid density in the range from 25 to 70 pounds per cubic foot, the position of the plastic tube within the embedment can be accurately located by pouring the concrete to the depth at which the vent is to be located, inserting the tube filled with water or a non-setting mixture of water and light weight aggregate of a density near that of the insulating concrete mix, onto the wet concrete and then finishing the pouring of the remaining concrete.

My invention is particularly well suited to systems which serve as hot water systems during the heating season of the year and for chilled water distribution during the air conditioning season.

During the air conditioning season the air circulation and drain ducts are closed to minimize the condensation of water vapor. However, despite all efforts to the contrary, some moisture will condense during this operation. As soon as the heating season is reached the air circulation ducts are opened to the atmosphere and air is allowed to circulate either under natural or forced draft as the conditions might require. Very quickly after heat is turned on the insulation will dry and long before the next air conditioning season is again at hand the insulation will be completely dry and working at maximum efficiency ready to repeat the cycle again.

It might be expected that drying of wet insulating concrete would take place only very slowly with my invention unless the cross sectional area of the air circulation ducts was made large compared to the cross sectional area of the insulation. However, carefully made experimental measurements have shown that my invention is highly effective and quickly responsive.

Heat losses were measured in an experimental insulated pipe system 20 feet long, of the shape shown in FIGURE 13, and consisting of a 4 inch 350° F. steam feed line and a 2 inch condensate return line spaced 4 inches apart insulated with approximately 6 inches of 23 pounds per cubic foot density insulating concrete at the sides, top, and bottom of the pipes.

The three air circulation and drain ducts 67, 68 and 69 were approximately 1¾ inches in diameter and were located as shown in FIGURE 13. The air was circulated by means of a thermal syphon of approximately 30 inches of level difference between inlet and outlet as indicated by the vents 37 and 38 of FIGURE 8. After initial warm up was accomplished the thermal loss was measured at approximately 200 B.t.u. per hour per sq. ft. of 350° F. pipe surface, which is a very acceptable design value. With only the natural thermal syphon air circulation the insulating value of the system improved and by the end of 20 days approximately 100 B.t.u. loss per hour per sq. foot of 350° F. pipe surface was measured. This proved conclusively that my invention was very effective at eliminating water from the system. Thief tube samples of insulation taken perpendicular to the pipes showed that the drying of the insulation was uniform with no lesser drying near the outlet than near the inlet.

As a further test of the effectiveness of my invention the heat was turned off and the ducts were filled with water to simulate accidental entry of water. After soaking 72 hours, the drains 34 and 36 were opened and the system again heated. Within 24 hours after the initial warm up was accomplished the conduit had a heat loss near the 100 B.t.u. level and after 3 days of continued heating it had again reached the 100 B.t.u. level.

From the foregoing, it will be apparent that the process of the present invention and the structures of the present invention provide an improved means for insulating pipes carrying fluids. The insulation value of the insulating concrete is preserved by the continuous removal of moisture and water, and the system operates at a higher thermal efficiency. These benefits are achieved at a very small cost which more than justifies their use.

This application is a continuation-in-part of my copending application Serial No. 689,584, now abandoned, filed October 11, 1957 and entitled "Underground Insulated Pipe Drain Duct."

I claim as my invention:

1. A fluid transportation system comprising an impervious pipe arranged to carry a heated fluid, a relatively vapor permeable, monolithic, lightweight thermal insulation surrounding the entire periphery of said pipe, said insulation during use being subject to accumulation of the free moisture therein, said insulation having at least one vent passage formed within the confines of said insulation and extending the full length of said insulation in parallel spaced relation to said pipe, and means for positively circulating air through said vent passage at a rate sufficient to carry away any moisture vapor which is forced into the vent passage from the vapor permeable insulation by the thermal gradient existing between the pipe and the outer periphery of said insulation.

2. A fluid transportation system comprising an impervious pipe arranged to carry a heated fluid, a relatively vapor permeable, monolithic, hydraulically set, lightweight concrete thermal insulation surrounding the entire periphery of said pipe, said insulation in its initially set condition including a substantial amount of free moisture therein between the periphery of said pipe and the outer periphery of said insulation, said insulation having at least one vent passage formed within the confines of said insulation and extending the full length of said insulation in parallel spaced relation to said pipe, said vent passage communicating with the ambient atmosphere, and means for positively circulating air through said vent passage at a rate sufficient to carry away moisture vapor which is forced into the vent passage from the vapor permeable insulation by the thermal gradient existing between the periphery of said pipe and the outer periphery of said insulation.

3. A fluid transportation system comprising an impervious pipe arranged to carry a heated fluid, a relatively vapor permeable, monolithic, hydraulically set, lightweight concrete thermal insulation surrounding the entire periphery of said pipe, said insulation in its initially set condition containing an excess of free moisture above that required for the setting of said insulation, said insulation having at least one vent passage formed within the confines of said insulation and extending the full length of said insulation in parallel spaced relation to said pipe, and a thermal siphon connected to said vent passage for positively circulating air through said vent passage at a rate sufficient to carry away moisture vapor which is forced into the vent passage from the vapor permeable insulation by the thermal gradient existing between the periphery of said pipe and the outer periphery of said insulation.

4. A fluid transportation system comprising an impervious pipe arranged to carry a heated fluid, a relatively vapor permeable, monolithic, hydraulically set, lightweight concerete thermal insulation surrounding the entire periphery of said pipe, said insulation in its initially set condition containing an excess of free moisture above that required for the setting of said insulation, said insulation having at least one vent passage formed within the confines of said insulation and extending the full length of said insulation in parallel spaced relation to said pipe, and a blower communicating with said vent passage for positively circulating air through said vent passage at a rate sufficient to carry away moisture vapor which is forced into the vent passage from the vapor permeable insulation by the thermal gradient existing between the periphery of said pipe and the outer periphery of said insulation.

References Cited in the file of this patent

UNITED STATES PATENTS

| | | |
|---|---|---|
| 384,860 | Meehan | June 19, 1888 |
| 1,991,455 | Gottwald | Feb. 19, 1935 |
| 2,081,867 | Gysling | May 25, 1937 |
| 2,355,966 | Goff | Aug. 15, 1944 |
| 2,773,512 | Burk | Dec. 11, 1956 |
| 2,896,669 | Broadway et al. | July 28, 1959 |